United States Patent Office 3,318,663
Patented May 9, 1967

3,318,663
MANUFACTURE OF HYDROGEN PEROXIDE
Gordon Randolph Hoey, Otterburn Park, Quebec, and David Hudson, St. Hilaire, Quebec, Canada, assignors to Canadian Industries Limited, Montreal, Quebec, Canada, a corporation of Canada
No Drawing. Filed Feb. 3, 1965, Ser. No. 430,176
Claims priority, application Canada, Feb. 26, 1964, 896,578
4 Claims. (Cl. 23—207)

This invention relates to an improved process for the manufacture of hydrogen peroxide.

In Canadian Patent No. 673,355 issued on Oct. 29, 1963, there is disclosed a process for the manufacture of hydrogen peroxide by the reduction of the disodium salt of anthraquinone disulphonic acid with hydrogen sulphide and subsequent oxidation of the reduced product with oxygen. The resulting hydrogen peroxide is separated from the alkaline disodium anthraquinone disulphonate solution by precipitation as calcium peroxide by the addition of calcium hydroxide at room temperature. In the carrying out of this process, it has been found that it is difficult to completely separate the anthraquinone disulphonic acid salt from the precipitated calcium peroxide. The calcium peroxide product is fine grained and usually contains several percent of anthraquinone disulphonic acid salt. This cannot be removed even by the use of unecomonically large amounts of wash water. Since the process recycles the anthraquinone disulphonic acid salt solution, economic operation requires that an efficient separation of the latter be employed. In addition the adsorbed anthraquinone disulphonic acid salt contaminates the hydrogen peroxide product.

It has now been found that effective separation of the anthraquinone disulphonic acid salt solution from the calcium peroxide precipitate can be attained if the calcium peroxide is percipitated in the form of coarse crystals of calcium peroxide octahydrate.

It is therefore an object of this invention to provide an improved process of the above type for the manufacture of hydrogen peroxide wherein the solid calcium peroxide intermediate is readily separated from the solution in which it is formed. Another object is to provide such an improved process for the manufacture of hydrogen peroxide wherein the anthraquinone disulphonic acid salt ingredient employed therein can be recovered and recycled for continuous use. Additional objects will appear hereinafter.

The improved process of this invention comprises reacting an hydrogen sulphide-containing gas with an aqueous solution of a salt of an anthraquinone disulphonic acid, thus producing elemental sulphur and the reduced anthraquinone disulphonic acid salt, separating the sulfur and oxidizing said reduced salt to form hydrogen peroxide thereby regenerating the starting anthraquinone disulphonic acid salt, reacting the hydrogen peroxide thus formed with a soluble calcium compound under conditions that produce a precipitate of coarse crystals of calcium peroxide octahydrate, separating said calcium peroxide crystals from the anthraquinone disulphonic acid salt solution, washing with water any residual anthraquinone disulphonic acid salt solution from the calcium peroxide crystals and recovering hydrogen peroxide from said calcium peroxide.

Alternatively the soluble calcium compound may be mixed with the reduced anthraquinone disulphonic acid salt prior to the oxidation step. In this manner the hydrogen peroxide is precipitated during the oxidation step and before it can react with residual hydrogen sulphide still present in the solution. In this procedure it is not necessary to sweep residual hydrogen sulphide from the solution prior to the oxidation step.

The improvement of this invention lies in the novel method of recovering a calcium peroxide with a low content of anthraquinone disulphonic acid salt from the reaction medium. If the calcium peroxide is precipitated without special precautions at room temperature by the addition of calcium hydroxide to a solution containing hydrogen peroxide and anthraquinone disulphonic acid salt the precipitate is usually finely divided. This finely divided precipitate of calcium peroxide, when separated from the solution, retains substantial amounts of the anthraquinone disulphonic acid salt. Effective separation of calcium peroxide from the mother liquor can be at tained if the calcium peroxide is precipitated as coarse grained calcium peroxide octahydrate. There are various conditions of precipitation which can lead to suitable precipitates.

A desirable aid to the obtaining of anthraquinone disulphonic acid sodium salt-free crystals of calcium peroxide octahydrate is a stable hydrogen peroxide containing solution. The cationic impurities can conveniently be removed by ion exchange resins.

It has also been found that calcium peroxide octahydrate changes to the dihydrate form at temperatures above 40° C. However, the temperature of transition is lowered by the presence of hydrogen peroxide in the surrounding aqueous solution. At 20° C. the octahydrate form is not stable for long periods in concentrations of hydrogen peroxide greater than 0.25% and at 25° C. the maximum concentration of hydrogen peroxide for long term stability of the octahydrate is 0.009%. However, the octahydrate form of calcium peroxide appears to be capable of existence in a metastable form for short periods of time at higher concentrations of hydrogen peroxide than indicated hereinbefore.

The presence of seed crystals of calcium peroxide octahydrate in the hydrogen peroxide containing anthraquinone disulphonic acid sodium salt solution aids in the forming of suitable precipitates. These seed crystals may be added to the solutions or may be present through a continuous process of precipitation.

It has been found that the preferred procedure for precipitating calcium peroxide is to run the aqueous solution of reduced anthraquinone disulphonic acid salt slowly into a well stirred precipitator containing a continuously aerated solution or slurry of calcium hydroxide in excess of the amount required to precipitate the calcium peroxide. The ingredients are maintained below 30° C. The calcium hydroxide concentration is maintained by the continuous addition of calcium hydroxide. In this procedure the hydrogen peroxide concentration in the precipitator will remain at a value less than the stoichiometric equivalent of the calcium hydroxide present. The calcium peroxide octahydrate precipitate prepared in this manner is readily washed free of anthraquinone disulphonic acid sodium salt. In addition the residual hydrogen sulphide in the solution will not reduce the yield of calcium peroxide octahydrate.

It has been found that the use of a solution of calcium hydroxide gives calcium peroxide octahydrate precipitates containing less adsorbed anthraquinone disulphonic acid sodium salt than the use of calcium hydroxide slurries.

It has been observed that when an aqueous solution of calcium hydroxide is added to an aqueous 0.6% solution of hydrogen peroxide containing dissolved anthraquinone sulphonic acid sodium salt it is possible to obtain a precipitate at room temperature of calcium peroxide octahydrate in spite of the high concentration of hydrogen peroxide. It is believed that the octahydrate crystals so formed are metastable.

When solid calcium hydroxide is added directly to an aqueous solution of hydrogen peroxide containing anthraquinone disulphonic acid sodium salt the precipitate formed is fine grained and the adsorbed anthraquinone disulphonate cannot be washed free from the crystals with water.

The precipitated calcium octahydrate can be conveniently separated from the anthraquinone disulphonic acid salt-containing mother liquor by centrifuging and washing the residual mother liquor from the solid with water. The solid calcium peroxide can then be dried by known procedures.

Alternatively, the calcium peroxide octahydrate after separation from the mother liquor may be converted to solid anhydrous calcium peroxide by immersion in a dilute aqueous solution of hydrogen peroxide at about 30° C. Washing of the anhydrous calcium peroxide product with acetone at room temperature provides a material containing only trace amounts of the anthraquinone disulphonic acid salt.

The hydrogen sulphide gas suitable for the process of this invention may be pure hydrogen sulphide or it may be a gas containing hydrogen sulphide and gases inert with respect to the reactions of the invention such as nitrogen or gaseous hydrocarbons. Low concentrations of carbon dioxide can be tolerated. However, the presence of oxygen in the hydrogen sulphide-containing gas will decrease the yield of hydrogen peroxide.

The anthraquinone disulphonates suitable as reactants in the process of this invention are the water soluble salts of anthraquinone disulphonic acid which do not form precipitates with hydrogen peroxide and include the sodium salts of the known isomers of anthraquinone disulphonic acid and mixtures thereof. The disodium salt of anthraquinone 2,7-disulphonic acid is the most water soluble of the isomeric sodium salts and, being commercially available, is the preferred reagent. However, the less soluble salts of the other isomers of anthraquinone disulphonic acid can be used at lower concentrations but the concentration of hydrogen peroxide produced will be less than when the 2,7-disulphonic acid derivative is employed. The anthraquinone disulphonate solution may be purified before use by passage through a cation ionic exchange resin.

The calcium peroxide produced by this process may be employed as such or may be used for the production of hydrogen peroxide or of oxygen by known methods.

When the calcium peroxide is converted to hydrogen peroxide it is essential to remove trace impurities before the hydrogen peroxide is concentrated by distillation. Metallic impurities may be removed by passage of the aqueous hydrogen peroxide solution through a cation-exchange resin such as the sodium salt of the well known sulphonated styrene-divinylbenzene copolymers. Traces of anthraquinone disulphonate remaining in the aqueous hydrogen peroxide solution can be removed by passage through a bed of activated carbon prior to distillation. Removal of the traces of anthraquinone disulphonates in this manner may permit simplification of the distillation process in that the solution need only be concentrated by evaporation of water without the necessity of distilling off the hydrogen peroxide.

The process of this invention is more fully illustrated by the following examples but it is to be understood that its scope is not limited to the specific embodiments therein described.

*Examples 1 to 12*

A series of solutions was prepared containing 0.5% by weight of hydrogen peroxide and varying amounts of anthraquinone 2,7-disulphonic acid disodium salt (ADA) dissolved in water. The hydrogen peroxide was precipitated as calcium peroxide octahydrate by the addition of a soluble calcium compound. In some cases seed crystals of calcium peroxide octahydrate were present. Sodium chloride was added to the solution to act as a tracer to determine the amount of free water in the precipitates. The calcium peroxide was precipitated at a temperature of 1°–3° C., separated by centrifuging and the precipitate washed with water. The results of the separations are shown in Table I. The percentages are by weight.

TABLE I

| Ex. | Calcium source | Concentration of ADA in solution, percent | Seed crystals, percent of product | pH during precipitation | Weight [1] of wet cake, grams | Solid | Volume of wash water, millilitres | Total inorganic solids in precipitate, percent | ADA in product, percent of total inorganic solids | Percent Calcium peroxide in form of CaO$_2$.8H$_2$O |
|---|---|---|---|---|---|---|---|---|---|---|
| 1 | Solid reagent Ca(OH)$_2$ | 12.2 | 0 |  | 260 | Unwashed cake | 0 | 34.2 | 23.7 | 30.0 |
|  |  |  |  |  |  | Washed cake | 534 | 16.1 | 16.1 |  |
|  |  |  |  |  |  | do | 1,500 |  | 8.8 |  |
| 2 | do | 8.1 | 0 |  | 260 | Unwashed cake | 0 | 32.9 | 17.6 | 78.0 |
|  |  |  |  |  |  | Washed cake | 1,632 | 33.4 | 5.6 |  |
|  |  |  |  |  |  | After reslurrying with H$_2$O | 2,755 | 34.2 | 4.4 |  |
|  |  |  |  |  |  | Partially dehydrated | 3,375 | 49.3 | 4.35 |  |
| 3 | do | 0.5 | 0 |  | 260 | Unwashed cake | 0 | 37.1 | 13.3 | 38.0 |
|  |  |  |  |  |  | Washed cake | 1,869 | 37.7 | 6.4 |  |
|  |  |  |  |  |  | After reslurrying with H$_2$O | 3,097 | 36.8 | 7.4 |  |
|  |  |  |  |  |  | Partially dehydrated | 3,495 | 59.1 | 7.2 |  |
| 4 | Calcium chloride | 5.2 | 0 | 11–12 | 273 | Unwashed cake | 0 | 30.1 | 4.26 | 96.5 |
|  |  |  |  |  |  | Washed cake | 1,112 | 30.5 | 2.73 |  |
| 5 | do | 5.1 | 33 | 10–11 | 110 | Unwashed cake | 0 | 18.4 | 0.99 |  |
|  |  |  |  |  |  | Washed cake | 650 | 23.8 | 0.03 |  |
| 6 | do | 8.9 | 50 |  | 163 | Unwashed cake | 0 | 32.0 | 2.1 | 99.0 |
|  |  |  |  |  |  | Washed cake | 468 | 31.0 | 0.39 |  |
| 7 | Solid reagent Ca(OH)$_2$ | 4.6 | 50 |  | 115 | Unwashed cake | 0 | 26.9 | 5.5 | 100 |
|  |  |  |  |  |  | Washed cake | 477 | 27.3 | 1.4 |  |
| 8 | Dissolved reagent Ca(OH)$_2$ | 1.7 | 0 |  | [2] 3 | Washed cake | 30 | 30.0 | 2.23 |  |
| 9 | do | 9.5 | 25 |  | [2] 10 | do | 100 | 30.5 | 1.12 |  |
| 10 | do | 9.5 | 15 | 10.6 | 162 | Unwashed cake | 0 | 30.1 | 2.89 | 100 |
|  |  |  |  |  |  | Washed cake | 456 | 28.8 | 0.52 |  |
| 11 | do | 11.0 | 30 | 10.6 | 154 | Unwashed cake | 0 | 31.4 | 1.63 | 100 |
|  |  |  |  |  |  | Washed cake | 352 | 31.1 | 0.02 |  |
| 12 | Dissolved commercial Ca(OH)$_2$ | 11.0 | 30 | 10.6 | 160 | Unwashed cake | 0 | 29.5 | 2.76 | 100 |
|  |  |  |  |  |  | Washed cake | 351 | 30.5 | 0.08 |  |

[1] Unless otherwise stated the precipitates were centrifuged.
[2] Filter.

The effectiveness of employing seed crystals of $$CaO_2 \cdot 8H_2O$$

in reducing the anthraquinone disulphonic acid salt retained on the washed precipitate is clearly shown.

*Examples 13 to 18*

A series of aqueous solutions was prepared containing purified anthraquinone 2,7-disulphonic acid disodium salt (ADA) and hydrogen peroxide. The anthraquinone 2,7-disulphonic acid salt was purified by passage through a column of the sodium salt of a strongly acidic cation ion exchange resin constituted by a sulphonated styrene-divinyl-benzene copolymer. The hydrogen peroxide was precipitated as calcium peroxide octahydrate by the addition of hydrogen peroxide solutions to calcium hydroxide slurries or solutions in excess of the stoichiometric amount required to react with the hydrogen peroxide. The ingredients were stirred vigorously during the precipitation. The precipitated calcium peroxide was separated from the mother liquor and washed with water. The results of the separations are shown in Table II where percentages are given on a weight basis.

The details of the washing of the filtered precipitate of Example 31 with water using a centrifuge is given in the following Table IV.

TABLE IV

| Percent ADA in filter cake | Percent ADA in washed precipitate as percent of $CaO_2$ | Wash water used, millilitres | Wash water, millilitres per 100 gm. of washed precipitate |
|---|---|---|---|
| 0.45 | 1.38 | 0 | 0 |
| 0.064 | 0.195 | 100 | 70 |
| 0.034 | 0.104 | 200 | 140 |
| 0.04 | 0.122 | 300 | 210 |
| 0.028 | 0.086 | 400 | 280 |
| 0.031 | 0.095 | 500 | 350 |

*Example 35*

25 grams calcium peroxide octahydrate which by analysis contained 32.3% by weight of calcium peroxide were mixed with 100 millilitres of aqueous hydrogen peroxide solution containing 0.25% hydrogen peroxide by weight. The mixture was allowed to stand for 16 hours at 30° C. The product was separated from the liquid by filtration and on analysis was found to contain 52.8% by weight of calcium peroxide. Washing of the product with about 50 millilitres of acetone at room temperature gave a product containing 90.5% by weight of anhydrous calcium peroxide.

When the calcium peroxide octahydrate starting material and the anhydrous calcium peroxide final product were analyzed for anthraquinone disulphonic acid salt it was found that during the conversion process the value had been reduced from 0.11% to 0.045% by weight of the anhydrous product.

TABLE II

| Example | Calcium source | ADA Concentration, Percent | Hydrogen peroxide concentration, Percent | Weight of washed precipitate, grams | $CaO_2$ in washed precipitate, Percent | Percent ADA in washed precipitate based on $CaO_2$ | Hydrate $H_2O$ in washed precipitate, Percent | Yield of active oxygen in washed precipitate, Percent | Hydrogen peroxide in filtrate, Percent | Temperature, °C. |
|---|---|---|---|---|---|---|---|---|---|---|
| 13 | Solid $Ca(OH)_2$ | 20 | 0.438 | 9.77 | 25.6 | 0.16 | 48.9 | 82.0 | 0.025 | 25 |
| 14 | do | 20 | 0.425 | 9.77 | 25.4 | 0.14 | 56.1 | 84.0 | 0.0064 | 25 |
| 15 | do | 10 | 0.498 | 12.98 | 24.0 | 0.13 | 56.3 | 94.0 | 0.0067 | 25 |
| 16 | do | 5 | 0.597 | 11.53 | 29.6 | 0.16 | 54.7 | 92.6 | 0.0015 | 25 |
| 17 | do | 18.6 | 0.455 | 177.1 | 21.9 | 0.15 | 53.5 | 95.3 | 0.0029 | 22–23 |
| 18 | Dissolved $Ca(OH)_2$ | 18.6 | 0.468 | 69.4 | 28.5 | 0.030 | 61.2 | 58.4 | 0.0075 | 22–25 |

*Examples 19 to 34*

A series of aqueous solutions was prepared containing anthraquinone 2,7-disulphonic acid disodium salt (ADA) and hydrogen peroxide. The hydrogen peroxide was precipitated by addition to an aqueous slurry or solution of calcium hydroxide, the calcium hydroxide concentration being in excess of the stoichiometric amount required to react with the hydrogen peroxide. In some cases the solutions contained seed crystals of calcium peroxide octahydrate. The precipitated calcium peroxide was filtered from the mother liquor and washed with water. The results of the preparations are shown in Table III where the percentages are given on a weight basis.

TABLE III

| Example | ADA Concentration, percent | Calcium source | Concentration of $H_2O_2$, percent | Weight of washed precipitate, grams | Seed crystals, percent | $CaO_2$ in washed precipitate, percent | ADA in washed precipitate, percent of $CaO_2$ | Yield of active oxygen in precipitate, percent | Hydrogen peroxide in filtrate, percent | Temperature, °C. |
|---|---|---|---|---|---|---|---|---|---|---|
| 19 | 20 | Solid $Ca(OH_2)$ | 0.438 | 9.8 | | 25.6 | 0.62 | 82.0 | 0.025 | 25 |
| 20 | 20 | do | 0.425 | 9.8 | | 25.4 | 0.55 | 84.0 | 0.0064 | 25 |
| 21 | 10 | do | 0.498 | 13.0 | | 24.0 | 0.54 | 94.0 | 0.0067 | 25 |
| 22 | 5 | do | 0.597 | 11.5 | | 29.6 | 0.54 | 92.6 | 0.0015 | 25 |
| 23 | 18.6 | do | 0.455 | 177.1 | | 21.9 | 0.68 | 95.3 | 0.0029 | 22–23 |
| 24 | 18.6 | Dissolved $(CaOH_2)$ | 0.468 | 69.4 | | 28.5 | 0.11 | 58.4 | 0.0075 | 22–25 |
| 25 | 20 | do | 0.33 | 79.3 | 44 | 23.9 | 0.037 | 90.6 | 0.0024 | 25 |
| 26 | 15 | do | 0.40 | 59.5 | 30 | 19.3 | 0.64 | 52.7 | 0.0074 | 23 |
| 27 | 10.8 | do | 0.27 | 70.2 | 50 | 23.0 | 0.065 | 80.2 | 0.0030 | 24 |
| 28 | 10.8 | do | 0.63 | 79.6 | 50 | 29.1 | 0.12 | 93.5 | 0.0025 | 23 |
| 29 | 11.0 | do | 0.5 | 154 | | 31.0 | 0.02 | | | 1–3 |
| 30 | 11.0 | do | 0.5 | 154 | | 32.9 | 0.088 | | | 1–3 |
| 31 | 10.8 | do | 0.60 | 143 | 28 | 32.7 | 0.095 | 77.0 | 0.0015 | 23 |
| 32 | 15 | do | 0.40 | 77.7 | 52 | 23.8 | 0.126 | 84.2 | | 23 |
| 33 | 15 | do | 0.090 | 3.6 | | 22.3 | 0.112 | 79.4 | 0.003 | 24 |
| 34 | 10 | do | 2.0 | 30.0 | | 28.5 | 1.2 | | 0.289 | 23 |

Example 36

To 4 liters of an aqueous solution containing 0.267 mole per litre of anthraquinone 2,7-disulphonic acid sodium salt was added at room temperature by means of a fritted glass disperser sufficient hydrogen sulphide gas to provide 0.1191 mole per litre of $H_2S$. No residual hydrogen sulphide was detected in the solution. The sulphur product was filtered off and weighed and found to be 0.1056 mole per litre of the solution.

The reduced anthraquinone disulphonate solution was added slowly at room temperature to a stirred slurry of calcium hydroxide in aqueous anthraquinone disulphonate solution through which air was being blown. The calcium hydroxide was in excess of that required to react with the hydrogen peroxide formed by the oxidation of the reduced anthraquinone disulphonate solution. The reduced anthraquinone disulphonate solution was added sufficiently slowly that it was oxidized almost immediately. When the oxidation was complete the calcium peroxide precipitate was filtered, washed with water and analyzed. The calcium peroxide product calculated as $CaO_2$ was equivalent to 0.0953 mole per litre. This was a yield of 80.0% based on the hydrogen sulphide used and a yield of 88.6% on the basis of the sulphur recovered.

What we claim is:

1. In a process for the manufacture of hydrogen peroxide wherein an hydrogen sulphide-containing gas is reacted with an aqueous solution of an alkali salt of an anthraquinone disulphonic acid, thus producing elemental sulphur and the reduced anthraquinone disulphonic acid salt, the sulphur being separated and the reduced anthraquinone disulphonic acid salt oxidized to produce hydrogen peroxide, the improvement whereby the hydrogen peroxide thus formed is separated as coarse grained readily filterable calcium peroxide octahydrate which comprises adding the aqueous alkaline solution of the reduced anthraquinone disulphonic acid salt to a stirred aqueous solution of a water soluble calcium compound which is continuously aerated with an oxygen-containing gas, the solution being maintained at a temperature below 30° C., the rate of addition of the reduced anthraquinone disulphonic acid salt being such that the concentration of the calcium compound remains in stoichiometric excess of that required to precipitate the hydrogen peroxide formed by the oxidation of the reduced anthraquinone disulphonic acid salt, thus precipitating coarse grained calcium peroxide octahydrate, separating said calcium peroxide from said solution, washing residual solution from said calcium peroxide with water and recovering hydrogen peroxide from said calcium peroxide.

2. A process as claimed in claim 1 wherein the water soluble calcium compound is calcium hydroxide.

3. A process as claimed in claim 1 wherein, prior to conversion to hydrogen peroxide, the calcium peroxide octahydrate is converted to anhydrous calcium peroxide by treating said calcium peroxide octahydrate with aqueous hydrogen peroxide solution at about 30° C., separating the solid product from the hydrogen peroxide solution and washing said product with a water-miscible organic solvent.

4. A process as claimed in claim 3 wherein the water-miscible organic solvent is acetone.

References Cited by the Examiner

UNITED STATES PATENTS 2,695,217  11/1954  Dunlop et al. _____ 23—207

FOREIGN PATENTS 673,355  10/1963  Canada.

OSCAR R. VERTIZ, *Primary Examiner.*

H. S. MILLER, *Assistant Examiner.*